United States Patent
Taniguchi et al.

(10) Patent No.: US 7,619,537 B2
(45) Date of Patent: Nov. 17, 2009

(54) SIGNAL PROCESSING CIRCUIT FOR ENCODER

(75) Inventors: Mitsuyuki Taniguchi, Shizuoka (JP); Hirofumi Kikuchi, Yamanashi (JP); Tadayoshi Matsuo, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 337 days.

(21) Appl. No.: 11/564,178

(22) Filed: Nov. 28, 2006

(65) Prior Publication Data
US 2007/0120557 A1  May 31, 2007

(30) Foreign Application Priority Data
Nov. 29, 2005  (JP)  ............................. 2005-343478

(51) Int. Cl.
*G08B 21/00* (2006.01)
(52) U.S. Cl. .............. 340/686.3; 340/686.2; 340/686.4; 340/686.1; 250/231.13; 250/231.14; 250/231.16; 341/11
(58) Field of Classification Search .............. 340/686.3, 340/686.2, 686.4; 341/11, 174; 250/231.13, 250/231.14, 231.16; 324/207.25; 33/1 PT, 33/1 N, 707, 501.7, 534
See application file for complete search history.

(56) References Cited

U.S. PATENT DOCUMENTS

| | | | | |
|---|---|---|---|---|
| 4,580,047 A * | 4/1986 | Sasaki et al. | ........... | 250/231.16 |
| 4,990,767 A | 2/1991 | Ernst et al. | | |
| 5,774,074 A * | 6/1998 | Cooper et al. | .................. | 341/11 |
| 5,930,905 A * | 8/1999 | Zabler et al. | ................. | 33/1 PT |
| 6,215,119 B1 * | 4/2001 | Markham et al. | ...... | 250/231.14 |
| 6,396,052 B1 * | 5/2002 | Barry et al. | ............ | 250/231.13 |
| 6,639,207 B2 * | 10/2003 | Yamamoto et al. | ...... | 250/231.14 |
| 2005/0217126 A1 * | 10/2005 | Inoue | ......................... | 33/1 PT |

FOREIGN PATENT DOCUMENTS

| | | |
|---|---|---|
| EP | 0787973 A1 | 8/1997 |
| JP | 3195117 B2 | 6/2001 |
| WO | WO 2004/048899 A1 | 6/2004 |

\* cited by examiner

*Primary Examiner*—Benjamin C Lee
*Assistant Examiner*—Sisay Yacob
(74) *Attorney, Agent, or Firm*—Lowe Hauptman Ham & Berner LLP

(57) ABSTRACT

In an encoder which is equipped with two detectors arranged on both sides of a rotating shaft in order to eliminate an eccentricity error, the mounting of the detectors is facilitated by making provisions so as to not cause a problem in the calculating of an average even if the detectors happen to be so mounted that the difference between the angular values calculated from the outputs of the respective detectors becomes equal to 180°. In an initialization process after power on, the difference $\Delta\theta$ between the angular values $\theta_1$ and $\theta_2$ calculated from the signals output from the respective detectors is stored as an initial value. Position data $\theta$ is output by taking an average between $\theta_3$ and $\theta_2$, where $\theta_3$ is a value obtained by correcting $\theta_1$ by the initial difference $\Delta\theta$.

8 Claims, 3 Drawing Sheets

SIGNAL PROCESSING CIRCUIT FOR ENCODER

BACKGROUND OF THE INVENTION

1. Field of the Invention

The present invention relates to a signal processing circuit for an encoder of a type having two detectors arranged on both sides of a rotating shaft in order to eliminate an eccentricity error.

2. Description of the Related Art

One of the detection errors that can occur in an encoder is an eccentricity error, i.e., the error caused by the eccentricity of its rotating part. This eccentricity error can be canceled by arranging two detectors on both sides of the rotating shaft and by taking an average between the angular values $\theta_1$ and $\theta_2$ calculated from their respective output signals, as described, for example, in the prior art section of JP 3195117B.

As the average $\theta=(\theta_1+\theta_2)/2$ is the average of angular values, it is not the mere average of the values, but the value of $\theta$ is chosen so that, after the averaging, the angle $\theta$ is located between $\theta_1$ and $\theta_2$, as shown in FIGS. 1 and 2.

However, in a certain type of encoder, such as a magnetic encoder, in which the detectors are mounted to the stator or rotor after the encoder is assembled, the difference between $\theta_1$ and $\theta_2$ calculated from the output signals of the respective detectors may become equal to 180°, depending on the mounting condition of the detectors; in that case, two solutions $\theta'$ and $\theta''$ can occur, resulting in a 180° displacement, as shown in FIG. 3.

Therefore, to avoid the above situation, in the prior art the detectors have had to be mounted by exercising care so that the difference between $\theta_1$ and $\theta_2$ will not become equal to 180° while considering the positional relationship between the detectors, and hence the problem that it takes time to mount the detectors appears.

SUMMARY OF THE INVENTION

It is accordingly an object of the present invention to provide a signal processing circuit that facilitates the mounting of the detectors in an encoder of the type in which two detectors are arranged on both sides of the rotating shaft in order to eliminate an eccentricity error.

According to the present invention, there is provided an encoder signal processing circuit, for calculating position data by processing signals output from first and second detectors arranged on both sides of a rotating shaft, comprising: angular value calculating means for calculating first and second angular values respectively from the output signals of the first and second detectors; initial difference storing means for storing an initial value of an angular difference calculated between the first and second angular values; correcting means for correcting one or the other of the first and second angular values by the initial value of the angular difference stored in the initial difference storing means; and position data calculating means for calculating the position data by taking an average between the two angular values after the correction is made by the correcting means.

When one or the other of the first and second angular values is corrected by the initial value of their difference, if the angular value before the correction contains an error associated with the positional relationship between the detectors, the two angular values after the correction become close to each other; as a result, if the detectors are mounted in any positional relationship, the situation where the difference between the two values becomes equal to 180°, causing two solutions to occur, can be prevented, and thus the mounting of the detectors can be facilitated.

DESCRIPTION OF THE PREFERRED EMBODIMENTS

Figure 1:
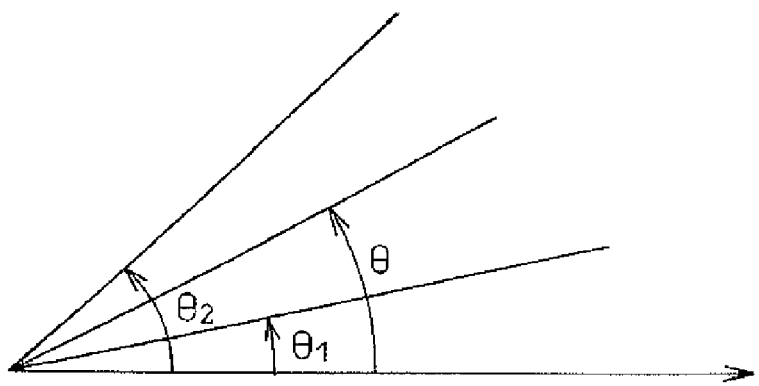
FIG. 1 is a diagram for explaining the averaging of angular values.
Figure 2:
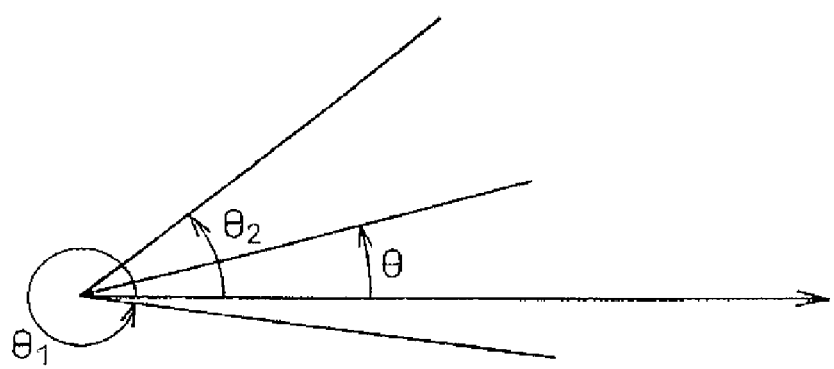
FIG. 2 is a diagram for explaining the averaging of angular values.
Figure 3:
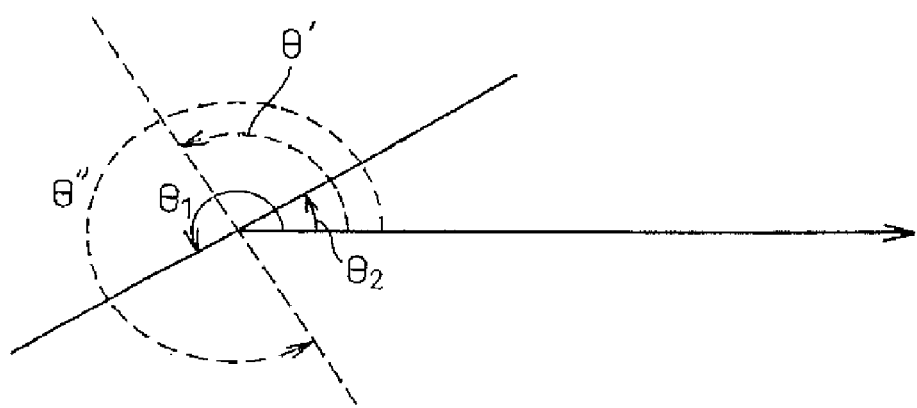
FIG. 3 is a diagram for explaining the problem of averaging that can occur when the angular difference is 180°.
Figure 4:
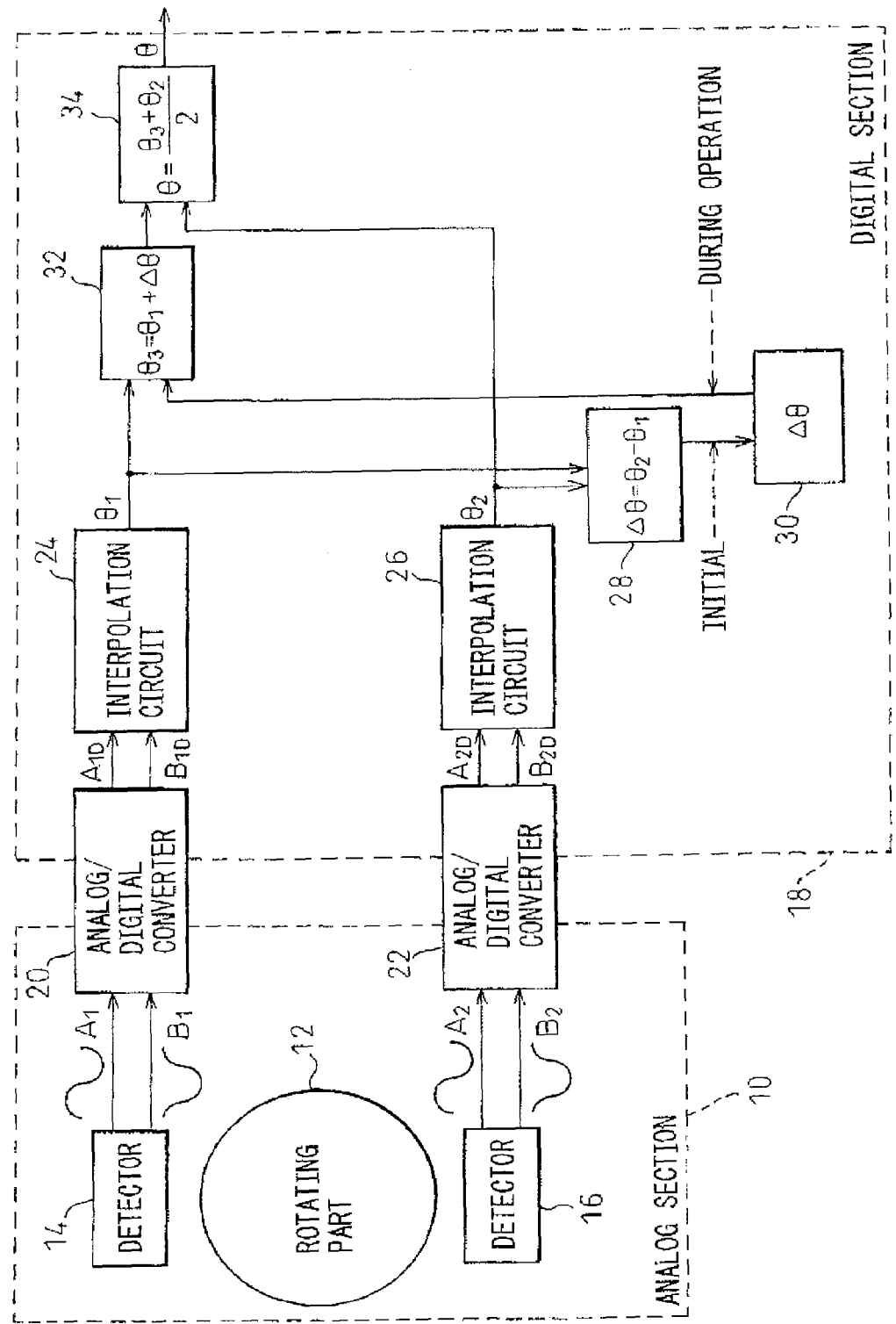
FIG. 4 is a block diagram showing a first embodiment of the present invention.

FIG. 4 is a block diagram showing the configuration of an encoder signal processing circuit according to a first embodiment of the present invention.

In an analog section 10, as a rotating part 12 rotates, two sine wave signals $A_1$ and $B_1$, 90° apart in phase, are output from a detector 14 mounted near the rotating part 12. Similarly, sine wave signals $A_2$ and $B_2$ are output from a detector 16 mounted opposite the detector 14 across the rotating part 12. Analog/digital converters 20 and 22, each interfacing the analog section 10 with a digital section 18, convert the analog values $A_1$, $B_1$, $A_2$, and $B_2$ into digital values $A_{1D}$, $B_{1D}$, $A_{2D}$, and $B_{2D}$, respectively. An interpolation circuit 24 calculates an angular value $\theta_1$ from the digital values $A_{1D}$ and $B_{1D}$ by a known method, and outputs the result. Similarly, an interpolation circuit 26 calculates an angular value $\theta_2$ from the digital values $A_{2D}$ and $B_{2D}$, and outputs the result.

A $\Delta\theta$ calculator 28 calculates $\Delta\theta=\theta_2-\theta_1$ (or $\theta_1-\theta_2$), and stores the value of $\Delta\theta$ in a memory 30 after mounting the detectors 14 and 16 and before initiating the operation of the encoder or in the initialization process after power on. Here, the value of $\Delta\theta$ may be measured a plurality of times, and its average value may be stored as $\Delta\theta$. A corrector 32 applies a correction by adding the value of $\Delta\theta$ stored in the memory 30 to the value of $\theta_1$ (or $\theta_2$), i.e., by the calculation of $\theta3=\theta_1+\Delta\theta$.

A position data calculator 34 calculates the average between the corrected value $\theta_3$ and the value of $\theta_2$, i.e., $\theta=(\theta_3+\theta_2)/2$, and outputs the result as the position data $\theta$.

In this way, by applying a correction by adding the initial difference $\Delta\theta$ to the angular value $\theta_1$, the initial phase difference associated with the positional relationship between the detectors 14 and 16 can be canceled, and the situation where the difference between $\theta_1$ and $\theta_2$ becomes equal to 18020 can thus be avoided. That is, when mounting the detectors 14 and 16, there is no need to exercise care so that the difference between the angular values calculated from the respective output signals will not become equal to 180°.

Figure 5:
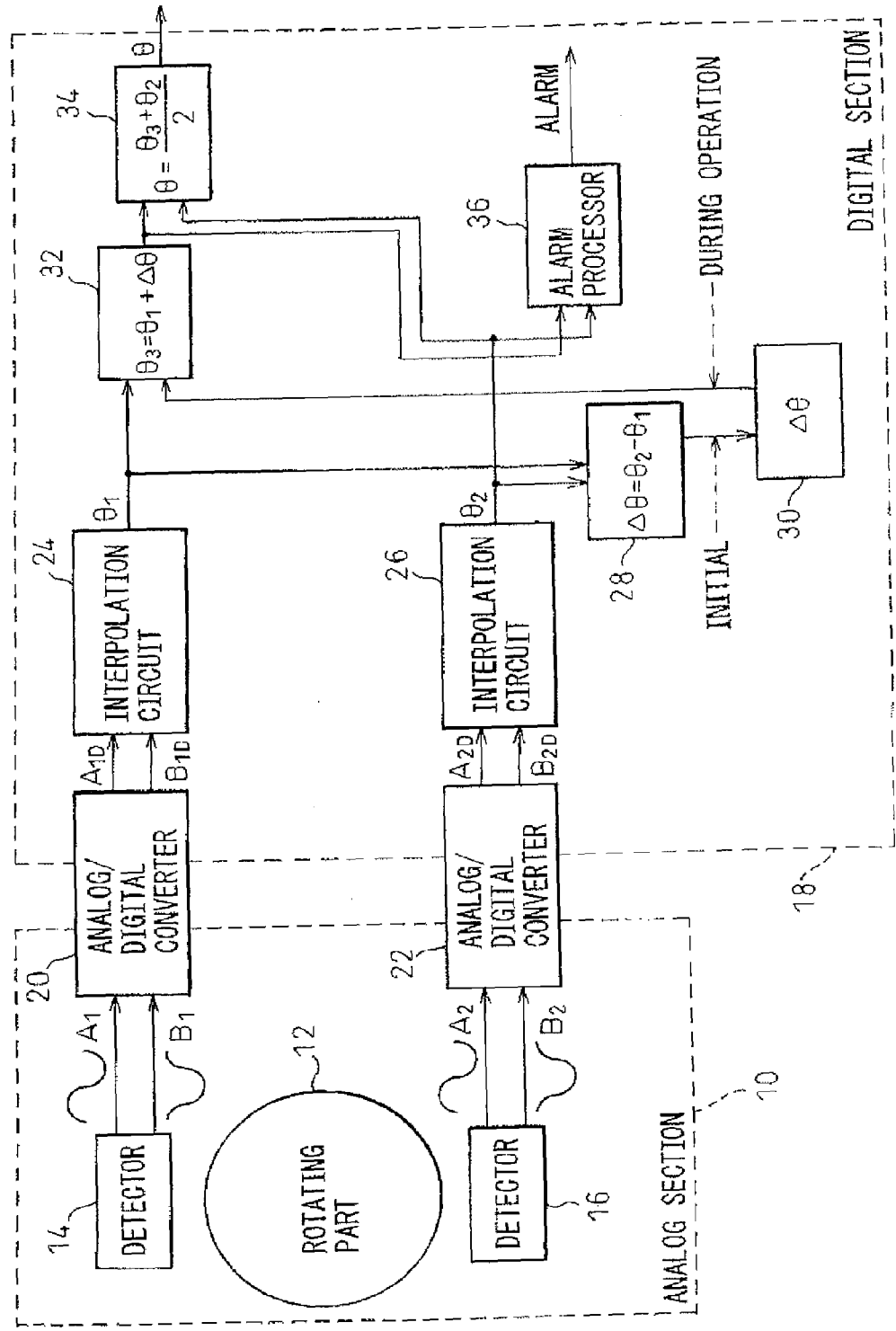
FIG. 5 is a block diagram showing a second embodiment of the present invention.

FIG. 5 shows a second embodiment according to the present invention. In this embodiment, an alarm processor 36 is added to the configuration of FIG. 4. The alarm processor 36 outputs an alarm when $180°-\theta_{ALM}<\theta_3-\theta_2<180°+\theta_{ALM}$, that is, when the angular difference $(\theta_3-\theta_2)$ after the correction lies within the range of 180° to $\theta_{ALM}$, where $\theta_{ALM}$ is a predetermined value.

In this way, an alarm can be issued whenever there arises the possibility of an abnormal value being output as the phase difference after the correction becomes close to 180° due, for example, to the breakage or a displacement in the mounting position of the detectors.

The invention claimed is:

1. An encoder signal processing circuit for calculating position data by processing signals output from first and second detectors arranged on both sides of a rotating shaft, comprising:
    angular value calculating means for calculating first and second angular values respectively from the output signals of the first and second detectors;
    initial difference stoning means for storing an initial value of an angular difference calculated between the first and second angular values;
    correcting means for correcting one of the first and second angular values by the initial value of the angular difference stored in the initial difference storing means; and
    position data calculating means for calculating the position data by taking an average between the two angular values after the correction is made by the correcting means.

2. An encoder signal processing circuit according to claim 1, further comprising alarm outputting means for outputting an alarm when the difference between the two angular values, after the correction is made by the correcting means, lies within a prescribed range.

3. An encoder signal processing circuit for calculating position data by processing signals output from first and second detectors arranged on opposite sides of a rotating shaft, said circuit comprising:
    an angular value calculating unit for calculating first and second angular values respectively from the output signals of the first and second detectors;
    an initial difference storing unit for storing an initial value of an angular difference calculated between the first and second angular values;
    a correcting unit for correcting the first angular value by adding the initial value of the angular difference stored in the initial difference storing unit to said first angular value to obtain a third angular value; and
    a position data calculating unit for calculating the position data by taking an average between the second angular value and the third angular value.

4. An encoder signal processing circuit according to claim 3, further comprising
    an alarm outputting unit for outputting an alarm when a difference between the second and third angular values lies within a prescribed range of 180°.

5. An encoder signal processing circuit for calculating position data for an encoder by processing signals output from first and second detectors arranged on opposite sides of a rotating shaft of the encoder, said circuit comprising:
    an angular value calculating unit for calculating first and second angular values respectively from the output signals of the first and second detectors;
    a calculator for, (a) after mounting the detectors on the opposite sides of the rotating shaft and before (b1) initiating operation of the encoder or (b2) during initialization of the encoder after the encoder is powered-on, calculating an initial value of an angular difference between the first and second angular values;
    an initial difference storing unit for storing the initial value of the angular difference calculated by the calculator;
    a correcting unit for, during operation of the encoder, correcting the first angular value by the initial value of the angular difference stored in the initial difference storing unit to obtain a third angular value; and
    a position data calculating unit for calculating the position data by taking an average between the second angular value and the third angular value.

6. An encoder signal processing circuit according to claim 5, further comprising
    an alarm outputting unit for outputting an alarm when a difference between the second and third angular values lies within a prescribed range of 180°.

7. An encoder signal processing circuit according to claim 5, wherein
    the correcting unit is configured for correcting the first angular value by adding the initial value of the angular difference stored in the initial difference storing unit to said first angular value to obtain the third angular value.

8. An encoder signal processing circuit according to claim 5, wherein the calculator is configured for calculating the angular difference between the first and second angular values multiple times and for outputting an average value of the calculated angular differences as the initial value of the angular difference to be stored in the initial difference storing unit.

* * * * *